Dec. 5, 1950          A. J. WRAY, SR          2,532,652
ROTARY SIDE DELIVERY RAKE
Filed July 6, 1948                                                  2 Sheets-Sheet 1
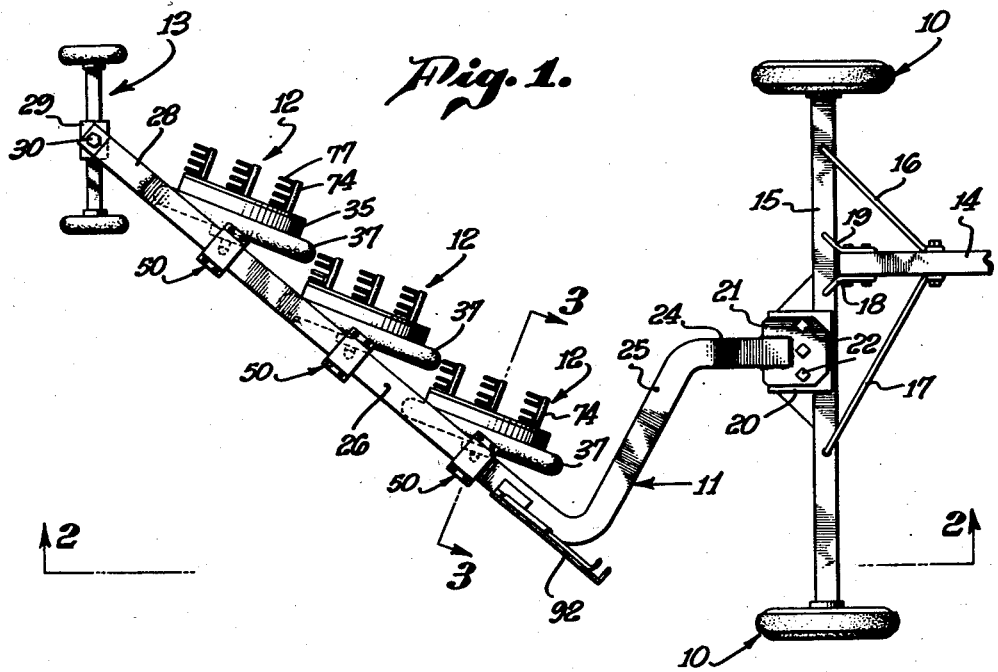
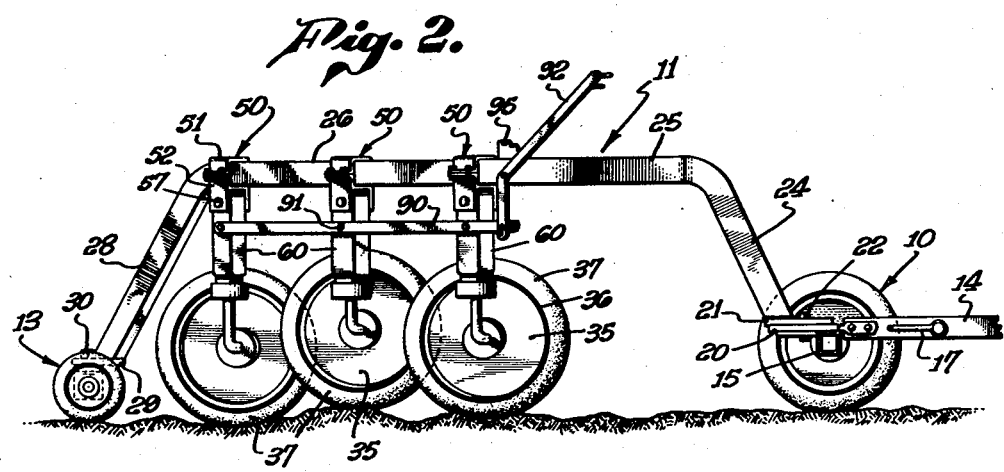
ALEXANDER J. WRAY, Sr.
INVENTOR.
BY Huebner, Maltby
and Beehler
ATTORNEYS.

Dec. 5, 1950 A. J. WRAY, SR 2,532,652
ROTARY SIDE DELIVERY RAKE
Filed July 6, 1948 2 Sheets-Sheet 2
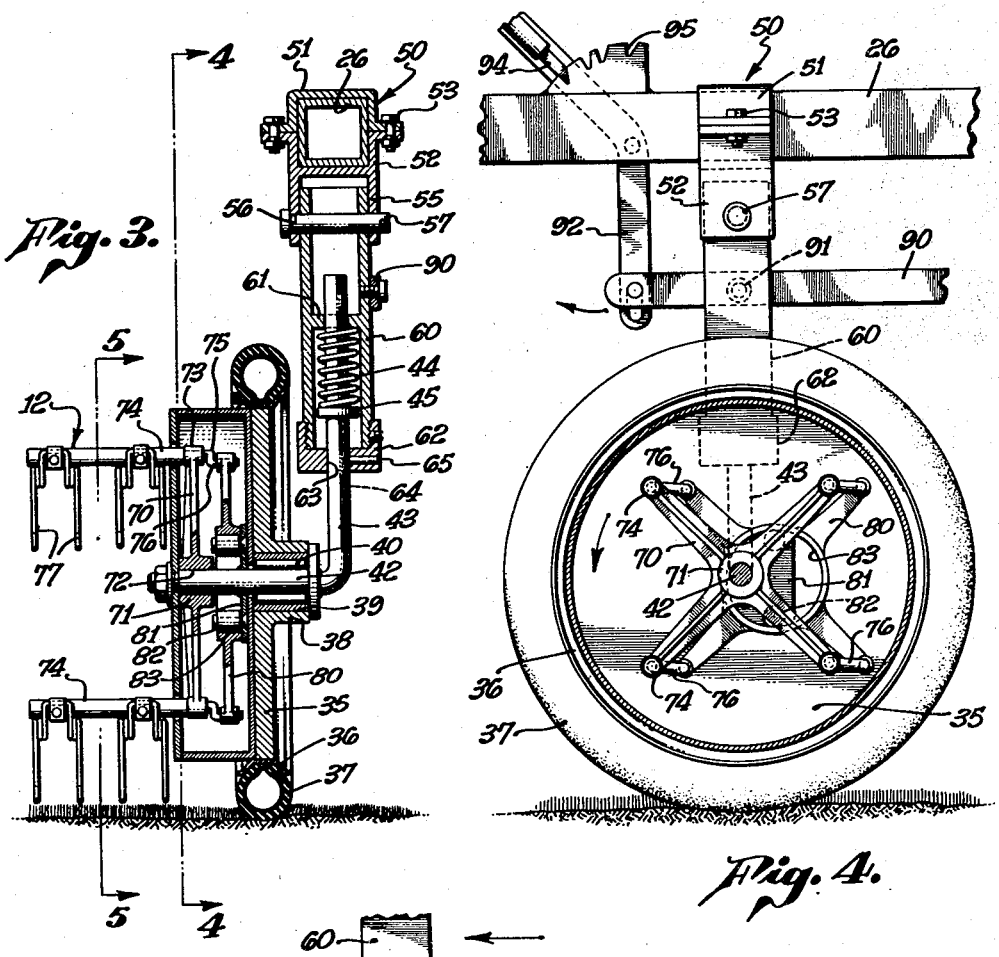
Fig. 3.
Fig. 4.
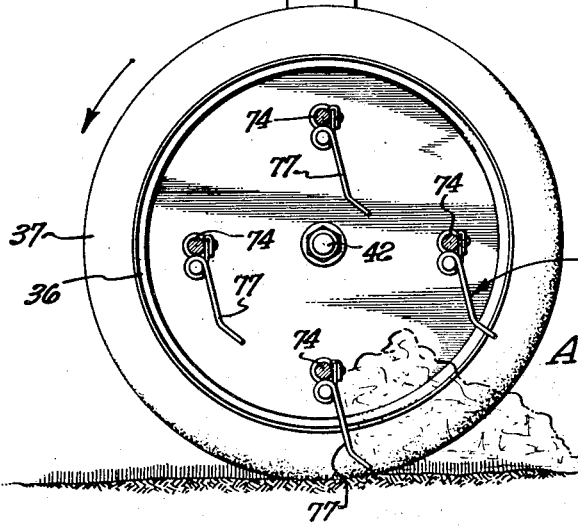
Fig. 5.
ALEXANDER J. WRAY, SR.
INVENTOR.
BY Huebner Maltby
Beehler
ATTORNEYS.

Patented Dec. 5, 1950

2,532,652

UNITED STATES PATENT OFFICE 2,532,652

ROTARY SIDE-DELIVERY RAKE

Alexander J. Wray, Sr., Pomona, Calif.

Application July 6, 1948, Serial No. 37,181

9 Claims. (Cl. 56—377)

My invention relates to an agricultural implement and has particular reference to a new and improved hay rake of the side delivery type.

Most side delivery hay rakes heretofore known have been constructed with a substantially rigid raking frame adapted to rotate as a unitary member. The disadvantages of such a rake are obvious when it is realized that hay is seldom raked from a smooth surface. In the event that irregularities are encountered either some of the hay on the ground will be missed and, therefore, lost or the rake will dig into obstructions which tends to load the hay with dirt or other undesirable matter.

It is an object of my invention to produce a hay rake having a plurality of raking wheels which are independently suspended from a frame so that they can individually ride up over obstructions without affecting the action of the other units.

One other attempt has been made, so far as I am aware, of individually suspending raking wheels. Such attempt, however, is not entirely satisfactory in that the raking elements depend upon contact with the ground to cause them to rotate and thereby rake hay. A further object of my invention is to provide a plurality of raking elements which are individually mounted on a frame and yet which do not depend upon contact with the ground to cause rotation or collection of the hay.

A further object of my invention is to produce a hay rake which rakes the hay to the side without collecting dirt and which is adapted to automatically drop the hay rather than carry portions of it over in a complete circle. This objective is accomplished by providing raking members which are always pointed in a substantially vertical direction regardless of the angular position of the raking assembly.

Other and further objects and advantages of my invention will become apparent from the drawings and the specifications relative thereto.

In the drawings:

Figure 1 is a top plan view of a hay rake embodying my invention.

Figure 2 is a side elevational view as seen on line 2—2 of Figure 1.

Figure 3 is an enlarged sectional view taken on line 3—3 of Figure 1.

Figure 4 is a sectional view taken on line 4—4 of Figure 3.

Figure 5 is a sectional view taken on line 5—5 of Figure 3.

As will be seen in Figure 1, my rake comprises essentially a pair of front or guide wheels 10, a rake supporting beam 11, a plurality of rakes 12 in echelon formation, mounted on said rake supporting beam and directed at an angle to the direction of travel, and a pair of trailer wheels 13. A drawbar 14 is secured to a front axle 15 of the front wheel assembly 10 by means of brackets 16, 17, 18 and 19. The drawbar 14 will be connected to any suitable source of power, such as a tractor or team of horses.

The axle 15 is formed with a coupling plate 20 to which the rake supporting beam 11 is securely fastened by means of plate 21 and a plurality of bolts 22.

The rake supporting beam 11 is formed with an upwardly extending member 24 and a horizontally positioned member 25 extending outboard from the centerline of the wheel assembly 10. The horizontal member 25 merges into a diagonal beam 26 extending from one side to the other of the centerline of the wheel assembly 15 and which is adapted to support the raking members.

The rake supporting beam is supported at the rear end by means of a downwardly extending element 28 which is pivotally supported by the rear wheel assembly 13 by means of the plate 29 and bolt 30.

For details of construction of the raking members, reference is made to the Figures 3, 4 and 5, wherein I have shown an individual raking member. It is to be understood that two or more, as conditions warrant, will be used and that the construction is identical.

The raking member comprises a wheel 35 having a rim 36 and a tire 37 mounted on said rim.

The wheel 35 is formed with a centrally disposed boss 38 having an axial bore 39 therethrough. The bore 39 is adapted to receive a bearing 40 which is supported by a horizontal axle 42. The horizontal axle 42 has a vertically extending section or shaft 43 which is adapted to resiliently mount the wheel 35 with respect to the frame of the rake by means of a coil spring 44 and a collar 45 formed as an integral part or securely mounted on the section 43.

The rake assembly is secured to the rake supporting beam 26 by means of a clamp 50 formed in two sections, 51 and 52, the sections 51 and 52 being held together by means of a nut-and-bolt assembly 53. The section 52 is formed with a downwardly extending skirt 55 having apertures 56 in axial alignment therethrough.

The housing 60 has an inwardly directed shoulder 61 against which the spring 44 is butted, thereby providing a resilient mounting for the shaft 43.

A cap 62 is adapted to enclose the lower section of the sleeve 60. The cap 62 is formed with an axial bore 63 which receives the shaft 43. The shaft 43 is formed with an undercut groove 64 and a pin 65 is inserted through the cap 62 into the groove 64, thereby permitting reciprocating movement of the shaft 43 with respect to the sleeve 60 by preventing rotational movement with respect thereto. It is to be understood that any type of spline fitting may be used which permits reciprocal, but not rotary, motion.

A rake support, such as spider 70, is rotatably disposed on the outer end of the axle 42 by means of a centrally disposed boss 71, which said boss is formed with an axial bore 72. The peripheral end of each of the legs of the spider 70 is formed with a boss 73 having an axial bore therethrough adapted to rotatably receive tine support or shaft 74. The shaft 74 is formed with a reduced end portion 75 which fits through the bore of the boss 73.

Whereas, I have herein shown the reduced end portion 75 and the shaft 74 as integral, it will be understood that the construction must be such to permit separation of the two parts for purposes of assembly.

The other end of the reduced section 75 is formed with an offset or crank member 76. Spring tines 77 are securely fastened to the shaft 74 and are adapted to rake hay upon rotation of the wheel or rake assembly, and as will be noted upon further description of the details, will always point substantially vertical.

An eccentric spider 80 having axial bores or bearings at the periphery of each of the legs thereof is adapted to receive each of the crank arms 76 in rotational engagement.

An eccentric bearing journal, such as flange 81, is non-rotatably mounted on the shaft 42 and is formed with a pair of rollers or bearing members 82 adapted to engage the inner surface of a bore 83 formed in the eccentric spider 80. Thus, it will be seen that regardless of the rotational position of the wheel or rake assembly, the eccentric spider 80 will remain always off center in the same relative position, which will cause rotation of the crank arms 76 with respect to the spider 70, thereby causing the spring tines to remain in a substantially vertical position.

The wheel or rake assembly being mounted on the rake supporting frame 26 by means of a pin 57 is pivotal with respect to said frame.

Referring to Figure 2, I have interconnected each of the wheel or rake assemblies by means of a bar 90 pivotally connected with each of the sleeves 60 by means of pins 91. The bar 90 is connected to a lever 92, which said lever is pivotally associated with the rake supporting frame 26. Rotation of the lever 92 in a counter-clockwise direction (Figure 2) will cause the bar 90 to move forward, thereby swinging the wheel or rake assemblies in a counter-clockwise direction and raising them from the surface of the ground.

In order to hold the lever 92 in its forward position, I have provided a ratchet or locking member 94 which is adapted to engage a notch 95 until released.

Upon connecting a source of power to the shaft 14 and pulling the rake to the right as viewed in Figure 1, friction on the ground will cause the wheel assemblies 12 to rotate, but since the wheels are inclined at an angle to the direction of travel, they will, in effect, side slip, thereby causing the hay to be raked and collected in windrows.

In the event that uneven ground is encountered, such as will be found in alfalfa checks, the rake assemblies 12 will move up over the obstruction independently of each other because, as was seen in Figure 3, they are independently spring mounted. Such action effectively prevents damage to alfalfa checks and prevents the rakes from digging into the soil. It is also to be noted from Figure 3 that the contact with the soil is by means of the tire 37 which holds the tines spaced from the soil so that hay, alfalfa, beans, or the like, can be effectively raked without including any substantial amount of dirt.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having described by invention, what I claim as new and desire to secure by Letters Patent is:

1. In a side delivery hay rake, a frame, means for attaching a source of power to said frame to drag said frame over the ground, a plurality of raking members resiliently suspended from said frame, said raking members being in echelon formation and having their planes of rotation at an angle oblique to the direction of travel of said frame, each of said raking members comprising a horizontally disposed axle, a wheel rotatably mounted on said axle, a rake support rotatably disposed on said axle, said rake support being formed with a plurality of bearing journals at the outer periphery thereof, a horizontally disposed tine support rotatably supported by each of said bearing journals, a plurality of raking tines supported by each of said horizontal tine supports, each of said horizontal arms being formed with a crank arm at the inner end thereof, a flange non-rotatably disposed over said horizontal shaft and formed with a plurality of roller bearings, a spider having an enlarged aperture disposed over said bearing means and adapted to rotate thereabout, said spider being formed with a plurality of arms adapted to rotatably connect with said crank arms, each of said raking assemblies being pivotally mounted to said frame and means for causing each of said raking members to pivot with respect to said frame, said means comprising a bar connected to each of said raking members and a lever adapted to move said bar.

2. In a side delivery hay rake, a frame, means for attaching the source of power to said frame to drag said frame over the ground, a plurality of raking members resiliently suspended from said frame, said raking members being in echelon formation and having their planes of rotation at an angle oblique to the direction of travel of said frame, each of said raking members comprising a horizontally disposed axle, a wheel rotatably mounted on said axle adapted to contact the ground, a spider rotatably disposed on said axle, said spider being formed with a plurality of arms, each of said arms having a bearing journal at the outer periphery thereof, a horizontally disposed arm rotatably supported by each of said bearing journals, a plurality of raking tines supported by each of said horizontal arms, each of said horizontal arms being formed with a crank arm at the inner end thereof, a flange non-rotatably disposed over said horizontal shaft and formed with eccentric bearing means, a second spider having an enlarged aperture disposed over said bearing means and adapted to rotate thereabout, said second spider being formed with a plurality of arms adapted to rotatably connect with said crank arms.

3. In a side delivery hay rake, a frame, means for attaching the source of power to said frame to drag said frame over the ground, a plurality of raking members resiliently suspended from said frame, said raking members being in echelon formation and having their planes of rotation at an angle oblique to the direction of travel of said frame, each of said raking members comprising a horizontally disposed axle, a wheel rotatably mounted on said axle, a spider rotatably disposed on said axle, said spider being formed with a plurality of arms, each of said arms having a bearing journal at the outer periphery thereof, a horizontally disposed arm rotatably supported by each of said bearing journals, a plurality of raking tines supported by each of said horizontal arms, each of said horizontal arms being formed with a crank member at the inner end thereof, a flange non-rotatably disposed over said horizontal shaft and formed with a plurality of roller bearings, a second spider having an enlarged aperture disposed over said roller bearings and adapted to rotate thereabout, said second spider being formed with a plurality of arms adapted to rotatably connect with said crank arms, each of said raking assemblies being pivotally mounted to said frame and means for causing each of said raking members to pivot with respect to said frame, said means comprising a bar connected to each of said raking members and a lever adapted to move said bar.

4. In a side delivery hay rake, a raking member mounted on a horizontally disposed axle and comprising a wheel rotatably mounted on said axle, a rake support rotatably disposed on said axle and being rotatable with said wheel, said rake support being formed with a plurality of bearing journals at the outer periphery thereof, a horizontally disposed arm rotatably supported by each of said bearing journals, a plurality of raking tines supported by each of said horizontal arms, each of said horizontal arms being formed with a crank member at the inner end thereof, an eccentric bearing non-rotatably disposed over said horizontal shaft, a spider having an enlarged aperture disposed over said bearing journal and adapted to rotate thereabout, said spider being formed with a plurality of arms adapted to rotatably connect with said crank arms.

5. In a side delivery hay rake, a raking member comprising a horizontally disposed axle, a wheel rotatably mounted on said axle, a spider rotatably disposed on said axle, said spider being formed with a plurality of arms, each of said arms having a bearing journal at the outer periphery thereof, a horizontally disposed arm rotatably supported by each of said bearing journals, a plurality of raking tines supported by each of said horizontal arms, each of said horizontal arms being formed with a crank member at the inner end thereof, a flange non-rotatably disposed over said horizontal shaft and formed with a plurality of roller bearings, a second spider having an enlarged aperture disposed over said roller bearings and adapted to rotate thereabout, said second spider being formed with a plurality of arms adapted to rotatably connect with said crank arms.

6. In a side delivery hay rake having a plurality of independently suspended raking members in echelon formation and adapted to move at an angle to their plane of rotation, each of said raking members comprising a wheel mounted on a horizontal shaft, a rake support rotatably disposed on said shaft and adapted to support horizontally disposed tine supports, each of said tine supports being formed with a crank arm, and an eccentric adapted to cause rotation of said tine supports with respect to said rake support upon rotation of said rake support.

7. In a side delivery hay rake having a plurality of independently suspended raking members in echelon formation and adapted to move at an angle to their plane of rotation, each of said raking members comprising a wheel mounted on a horizontal shaft and adapted to rotate upon contact with the ground, a spider rotatably disposed on said shaft and having a plurality of radial arms adapted to support horizontally disposed tine supports, each of said tine supports being formed with a crank arm, and an eccentric adapted to cause rotation of said tine supports with respect to said rake support upon rotation of said rake support.

8. In a side delivery hay rake having a plurality of independently suspended raking members in echelon formation and adapted to move at an angle to their plane of rotation, each of said raking members comprising a wheel mounted on a horizontal shaft and adapted to rotate upon contact with the ground, a spider rotatably disposed on said shaft and having a plurality of radial arms adapted to support horizontally disposed tine supports, each of said tine supports being formed with a crank arm, and an eccentric spider adapted to cause rotation of said tine supports with respect to said rake support upon rotation of said rake support.

9. In a side delivery hay rake having a plurality of independently suspended raking members in echelon formation and adapted to move at an angle to their plane of rotation, each of said raking members comprising a wheel mounted on a horizontal shaft and adapted to rotate upon contact with the ground, a spider rotatably disposed on said shaft and having a plurality of radial arms adapted to support horizontally disposed tine supports, each of said tine supports being formed with a crank arm, a non-rotatable eccentric bearing support disposed on said shaft, and an eccentric spider rotatably connecting each of said crank arms to cause rotation of said tine supports with respect to said rake support upon rotation of said rake support.

ALEXANDER J. WRAY, Sr.

REFERENCES CITED

The following references are of record in the file of this patent:

UNITED STATES PATENTS

| Number | Name | Date |
|---|---|---|
| 2,403,401 | Rietz | July 2, 1944 |
| 2,447,354 | Morrill | Aug. 17, 1948 |